United States Patent [19]

Klees et al.

[11] Patent Number: 4,569,199
[45] Date of Patent: Feb. 11, 1986

[54] TURBOPROP ENGINE AND METHOD OF OPERATING THE SAME

[75] Inventors: Gary W. Klees; Paul E. Johnson, both of Mercer Island, Wash.

[73] Assignee: The Boeing Company, Seattle, Wash.

[21] Appl. No.: 427,631

[22] Filed: Sep. 29, 1982

[51] Int. Cl.⁴ .................. F02K 3/06; F02K 3/075
[52] U.S. Cl. .................... 60/226.1; 60/263; 60/39.02
[58] Field of Search .......... 60/226.1, 226.3, 244, 60/262, 224, 263, 39.02; 415/79, 145

[56] References Cited

U.S. PATENT DOCUMENTS

| | | | |
|---|---|---|---|
| 2,619,795 | 12/1952 | Drake | 60/226.1 X |
| 2,978,865 | 4/1961 | Pierce | 60/262 |
| 3,117,750 | 1/1964 | Snell | 60/226.1 X |
| 3,548,597 | 12/1970 | Etessam | 60/226.1 |
| 3,635,029 | 1/1972 | Menloux | 60/224 |
| 3,638,428 | 2/1972 | Shipley et al. | 60/226.1 |
| 3,779,282 | 12/1973 | Klees | 60/204 |
| 3,792,584 | 2/1974 | Klees | 60/204 |
| 3,854,286 | 12/1974 | Klees | 60/204 |
| 3,913,321 | 10/1975 | Snell | 60/226.1 |
| 3,938,328 | 2/1976 | Klees | 60/262 |
| 4,033,119 | 7/1977 | Nichols | 60/263 X |
| 4,038,818 | 8/1977 | Snell | 60/226.1 |
| 4,043,121 | 8/1977 | Thomas et al. | 60/204 |
| 4,052,845 | 10/1977 | Tumavicus | 60/226.1 |
| 4,054,030 | 10/1977 | Pederson | 60/262 |
| 4,060,981 | 12/1977 | Hampton | 60/226.1 |
| 4,085,583 | 4/1978 | Klees | 60/204 |
| 4,214,610 | 7/1980 | James et al. | 60/226.3 X |
| 4,222,235 | 9/1980 | Adamson et al. | 60/226.1 |
| 4,292,802 | 10/1981 | Snow | 60/204 |
| 4,446,696 | 5/1984 | Sargisson et al. | 60/226.3 |

FOREIGN PATENT DOCUMENTS 713783 8/1954 United Kingdom ............. 60/226.1

Primary Examiner—Carlton R. Croyle
Assistant Examiner—Jeffrey A. Simenauer
Attorney, Agent, or Firm—Hughes & Cassidy

[57] ABSTRACT

A turboprop engine having a variable pitch propeller driven through a speed reducing transmission. The engine has a compressor section with a low pressure component and a high pressure component. A flow control device is positioned between the low and high pressure components. During takeoff, air from the low pressure component is bypassed, and during cruise, the air from the low pressure component is passed directly through the high pressure component, thus obtaining improved matching of engine components for both takeoff and cruise.

27 Claims, 15 Drawing Figures

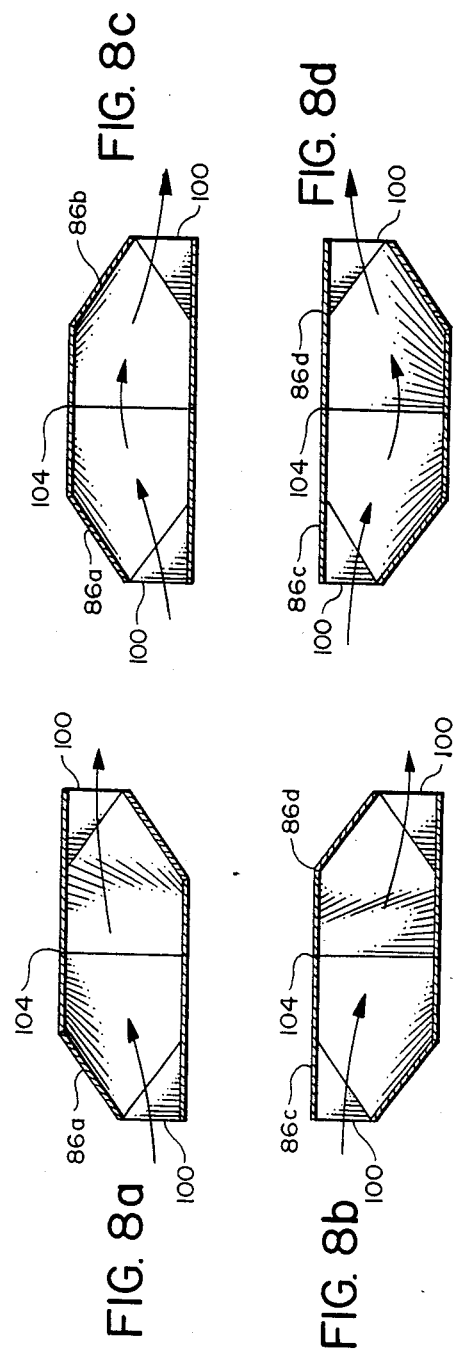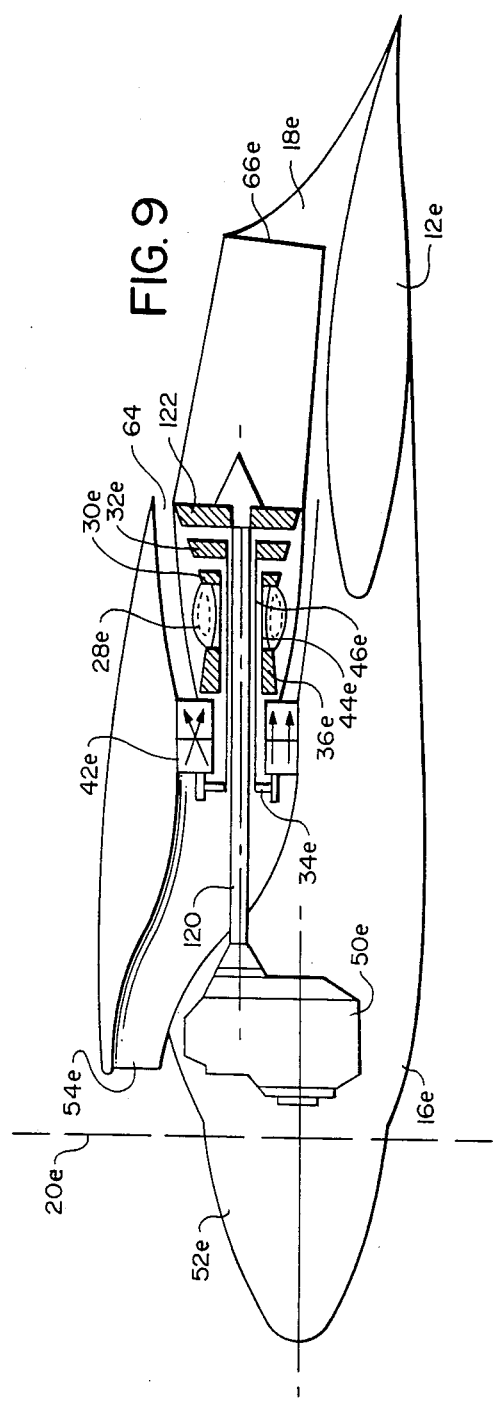

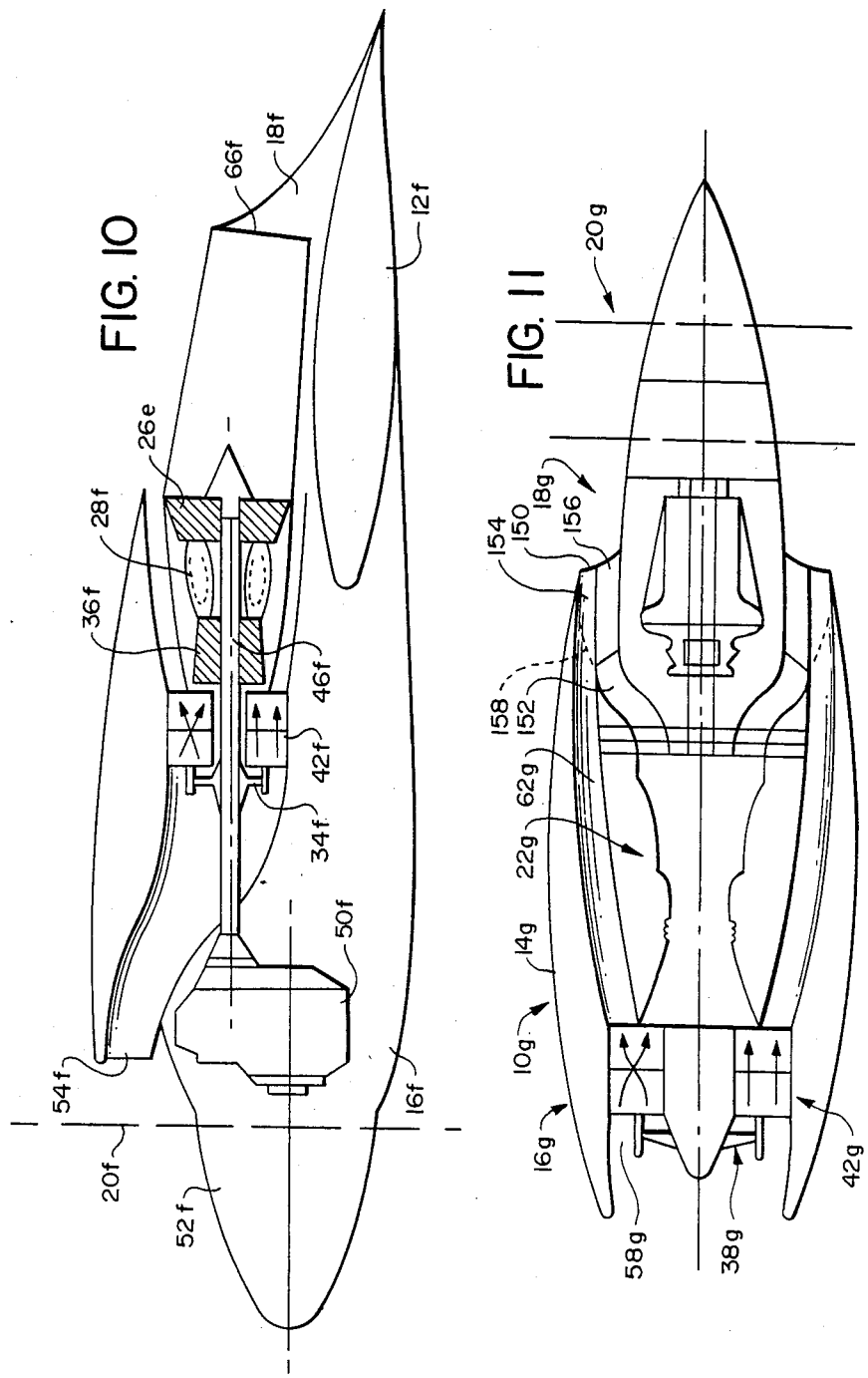

TURBOPROP ENGINE AND METHOD OF OPERATING THE SAME

TECHNICAL FIELD

The present invention relates to turboprop engines for use in aircraft propulsion and to a method of operating such engines

BACKGROUND ART

A significant advantage of turboprop engines in comparison to, for example, turbofan engines is that the turboprop engine can operate in the cruise mode at a relatively low specific fuel consumption. However, there are with the turboprop engine certain features that result in design problems which are of less significance with respect to turbofan engines In a modern turbofan engine having a bypass ratio as high as possibly five or six, the diameter of the fan is of a size that it can be driven directly from the turbine at the same rotational speed as the turbine not requiring a gear box or transmission. Also, the rotating blades of the fan generally have a fixed pitch, while in a turboprop engine there are generally variable pitch blades. Further, in a turbofan engine, it is possible to match the compressor and turbine to optimize specific fuel consumption for the cruise mode, with this same match working quite well in the take-off and climb mode of operation.

On the other hand, in a turboprop engine, the bypass ratio of the propeller may be as high as eighty. Because of the large propeller diameter and relatively small engine size, the rotational speed of the propeller must be reduced, relative to the rotational speed of the turbine, this being accomplished by placing a speed reducing gear drive between the turbine shaft and the propeller. Further, to optimize operation of the turboprop engine, the blades must be mounted for variable pitch for two reasons. First, during the various operating modes of the engine, the pitch (i.e. angular position) of the blades should be changed to obtain optimum efficiency. Second, it is desirable that the propeller blades be able to be moved to a position to provide reverse thrust, thus eliminating the need for the thrust reverser of a conventional turbofan engine. For a turboprop engine that is to be used in a present day twin engine, 120 passenger commercial aircraft flying near Mach 0.8, the weight of the speed reducing gear transmission in combination with the apparatus to provide variable pitch to the propeller blades may be as high as 1000 pounds or more (i.e. 454 kg or more).

With regard to the matching of engine components, this becomes a problem of substantially greater significance in comparison with turbofan engines, primarily because of the substantially greater bypass ratio typical of turboprop engines. When the turboprop engine is operating in the cruise mode at a higher altitude, the engine operates most efficiently with the propeller blades set at a relatively steep pitch, and with the compressor operating at a relatively high compression ratio (i.e. in the order of 30 to one or possibly as high as 40 to one) or possibly higher for future designs. However, with the engine components sized and matched to operate at relatively low specific fuel consumption in the cruise mode, this same engine is overpowered for the take-off and climb mode of operation. During take-off and climb, the propeller blades operate most effectively when they are set at a relatively shallow pitch and are rotated at about the same speed as during the cruise mode. In these circumstances, the propeller blade does not need the full power which the turbine can generate during take-off and climb conditions when operating in a range of reasonable efficiency. If the engine were operated at such a power setting during take-off and climb, this excess power would be passed to the propeller blades, which in turn would have to be set at a steeper pitch to absorb the power generated by the turbine. Not only would this cause the propeller blades to operate more inefficiently, but it would substantially increase the torque loads transmitted through the gear box. This would in turn either overstress the components of the gear transmission or require the gear box to be designed for such higher loads, this resulting in unneccessary increased weight.

Accordingly, the more common prior art approach has been to either throttle the engine back during take-off and climb or derate the engine in some manner for this mode. However, throttling the engine back simply causes the engine to operate in a condition which is in the more inefficient range of the specific fuel consumption curve. Derating the engine, for example by bleeding air for the compressor and/or setting the stator vanes at a position for lower compression ratios, also results in inefficiencies. Thus, there is the dilemma that if the turboprop engine is designed to optimize operation at cruise, it suffers certain inefficiencies during the take-off and climb mode.

One prior art approach to alleviate this problem is to combine the turboprop with a turbofan engine so that there is both a propeller and a fan. This concept was discussed briefly in a paper entitled "Advanced Turboprop Transport Development - A Perspective", presented by Murray A Booth at the 13th Congress of the International Counsel of Aeronautical Sciences, August 22-27, 1982, Seattle, Washington.

A search of the patent literature disclosed a number of patents showing various devices to divert or bypass flow in jet engines. Although these in general do not relate directly to turboprop engines, these patents are cited herein to insure that the applicants are complying with their duty to make a full disclosure of all prior art of any possible relevance. These patents are as follows:

U.S. Pat. No. 2,978,865, Pierce, shows a device for mixing the exhaust of a turbofan engine.

U.S. Pat. No. 3,117,750, Snell, shows an aircraft engine having devices for selectively diverting the airflow.

U.S. Pat. No. 3,548,597, Etessam, discloses an aircraft gas turbine engine having a supplementary compressor driven by the exhaust gasses to precompress air that is fed to the main compressor. The embodiments shown are stated to be applicable to turboprop engines, helicopter engines, jet engines, supersonic power plants incorporating the after-burners and power plants for vertical-take-off aircraft.

U.S. Pat. No. 3,635,029, Menloux, discloses a composite gas turbine ramjet engine where there is an outer through duct for ramjet operation.

U.S. Pat. No. 3,638,428, Shipley et al, discloses a fan jet engine having a low pressure and a high pressure compressor section. There is a device to bypass air to the fan duct to optimize flow to the high pressure compressor section.

U.S. Pat. No. 3,913,321, Snell, shows a gas turbine engine where there is a forward low pressure section and a year high pressure section. The low pressure section has forward and rear portions. Flow from the forward portion can, in one operating mode, be bypassed around the second portion, and inlet air can be caused to bypass the forward portion and pass directly into the second portion.

U.S. Pat. No. 4,038,818, Snell, shows another arrangement having generally the same operating principles as the above mentioned Snell patent.

U.S. Pat. No. 4,043,121, Thomas et al, discloses a two spool engine where there is an auxiliary fan positioned at the periphery of the fan of the conventional turbofan engine. Variable vanes and nozzles are utilized to vary the bypass ratio.

U.S. Pat. No. 4,052,845, Tumavicus, shows a variable ratio bypass turbojet engine having a particular flapper valve mechanism to vary the bypass ratio. During cruise, there is a low bypass ratio so that the front fan air is conducted to the core engine. For take-off condition, the front fan air is discharged to atmosphere through a thrust nozzle and the auxiliary inlet air is directed to the core engine fan.

U.S. Pat. No. 4,054,030, Pederson, discloses a variable cycle gas turbine engine having specific, mechanical devices to selectively bypass air from the forward compressor stage.

U.S. Pat. No. 4,060,981, Hampton, shows a jet engine having co-annular ducts. There is a valve device positioned between the forward and rear compressor sections which permits both the inner and outer upstream duct flows to be directed to either the inner or outer downstream duct, depending upon the orientation of the vane. Alternatively, either or both of the fluid streams can be blocked off entirely In U.S. Pat. No. 4,292,802, Snow, there is a fan jet engine having blocker door vanes disclosed in the bypass duct to selectively close off the bypass flow and thus increase the airflow into the second compressor stage.

In British Patent Specification No. 713,783, there is shown a jet engine where the fan air can be selectively diverted into the second compressor stage.

In addition to the patents noted above, there are a number of U.S. patents issued to Garry W. Klees, one of the co-inventors in the present application, these patents being:

U.S. Pat. Nos. 3,779,282; 3,792,584; 3,854,286; 3,938,328; and 4,085,583. These patents show various arrangements for air breathing gas turbine engines having a particular configuration for a flow bypass mechanism which has inner and outer annular portions. In one position, airflow into the outer annular portion can be passed through to an outer annular duct, and air passing into the inner annular portion is passed into an inner annular duct. In another position, the flow can be reversed, so that the outer annular flow can be diverted into the inner annular duct, and the inner annular flow diverted outwardly into the outer annular duct. This particular valving arrangement has been found to be quite advantageous and is incorporated into the preferred embodiment of the present invention which is described later herein.

In view of the foregoing, it is an object of the present invention to provide a turboprop engine and a method of operating the same, with a view to alleviating some of the above indicated problems relating particularly to turboprop engines.

SUMMARY OF THE INVENTION

The turboprop engine of the present invention comprises a compressor having a low pressure compressor component and a high pressure compressor component. There is a turbine operatively connected through drive means to the compressor, and a combustion section arranged to receive airflow from the compressor and burn fuel therein to provide a gaseous flow to drive the turbine.

A variable pitch propeller is rotatably mounted and positioned to react against ambient air to produce a thrust. This propeller is driven through a speed reducing transmission operatively connected between the turbine and the propeller to drive the propeller at a reduced rotational speed relative to the turbine.

Air inlet means directs airflow into the engine. There is air inlet bypass means arranged to provide a bypass inlet airflow that bypasses the low pressure compressor component. Also, there is air outlet bypass duct means arranged to provide airflow that bypasses the high pressure compressor component, combustion section, and the turbine.

Flow control means is operatively positioned to receive airflow from the air inlet bypass means and airflow from the low pressure compressor component. This flow control means directs airflow to the air outlet bypass duct means and airflow to the high pressure compressor component. The flow control means has a first position where airflow from the air inlet bypass means is directed to the high pressure compressor component, and airflow from the low pressure compressor component is directed to the air outlet bypass duct means. The flow control means has a second position where airflow from the air inlet bypass duct means is directed to the air outlet bypass duct means, and air from the low pressure compressor component is directed to the high pressure compressor component.

In one embodiment, there are first and second turbine stages and first and second compressor sections operatively connected to the second and first turbine stages, respectively. The first compressor section has forward and rear portions, with the flow control means being operatively positioned between the first and second portions of the first compressor section, whereby the forward compressor portion comprises the low pressure compressor component and the second compressor portion and the second compressor section comprises the high pressure compressor component. In another form, the flow control means is positioned between the first and second compressor sections.

In another embodiment, there is a third turbine stage which is operatively connected to the speed reducing transmission.

In yet a further embodiment, there is a single drive connection from the turbine to both the low pressure and high pressure compressor components.

In one form, the propeller is mounted forwardly of the air inlet means, and in another version the propeller is mounted rearwardly of the turbine. With the aft mounted propeller, the flow from the bypass duct and the flow from the turbine can exit along separate flow paths, and in an alternative arrangement, these can be mixed for a combined flow.

In the preferred form of the flow control means, there is a forward flow control section having a forward inlet and a rear outlet and a second flow control section having a forward inlet and a rear outlet. The inlet of the first flow control section has inner and outer annular ducts, with the inner and outer annular ducts expanding radially toward said outlet so as to be arranged circumferentially adjacent each other and form duct outlets of the first flow control section. The second flow control section has duct inlets matching in configuration the duct outlets of the first flow control section. The duct inlets of the second flow control section diminish in width radially in a rearward direction and terminate in duct outlets of the second flow control section, with the duct outlets of the second flow control section being arranged in inner and outer sets of duct outlets. There is means to rotate the first and second flow control sections relative to one another.

In the preferred form, with the flow control means in the first position, flow through the bypass duct relative to flow through the high pressure compressor component has a bypass ratio of about 0.5 to 1.0. The low pressure compressor component has a compression ratio of about 1.4 to 2.0, and the high pressure compressor component has a compression ratio between about 20 to 30.

In the method of the present invention, the engine is operated during take-off mode of operation with the flow control means in the first position to produce thrust from airflow through the air outlet bypass duct means. During the cruise mode, the flow control means is moved to the second position to direct airflow from the low pressure compressor component to the high pressure compressor component.

Other features of the present invention will become apparent from the following detailed description.

BRIEF DESCRIPTION OF THE DRAWING

FIGS. 8a through 8d are cross-sectional views through the duct means of FIGS. 4 and 7, taken as noted thereon;

FIG. 9 is a semi-schematic view, similar to FIG. 1, of a second embodiment of the present invention;

FIG. 10 is a view similar to FIGS. 1 and 9 showing yet a third embodiment of the present invention; and FIG. 11 is a view similar to FIGS. 1, 9, and 10, showing a fourth embodiment of the present invention where a dual propeller is mounted at the aft end of the engine.

BEST MODE FOR CARRYING OUT THE INVENTION

Figure 1:
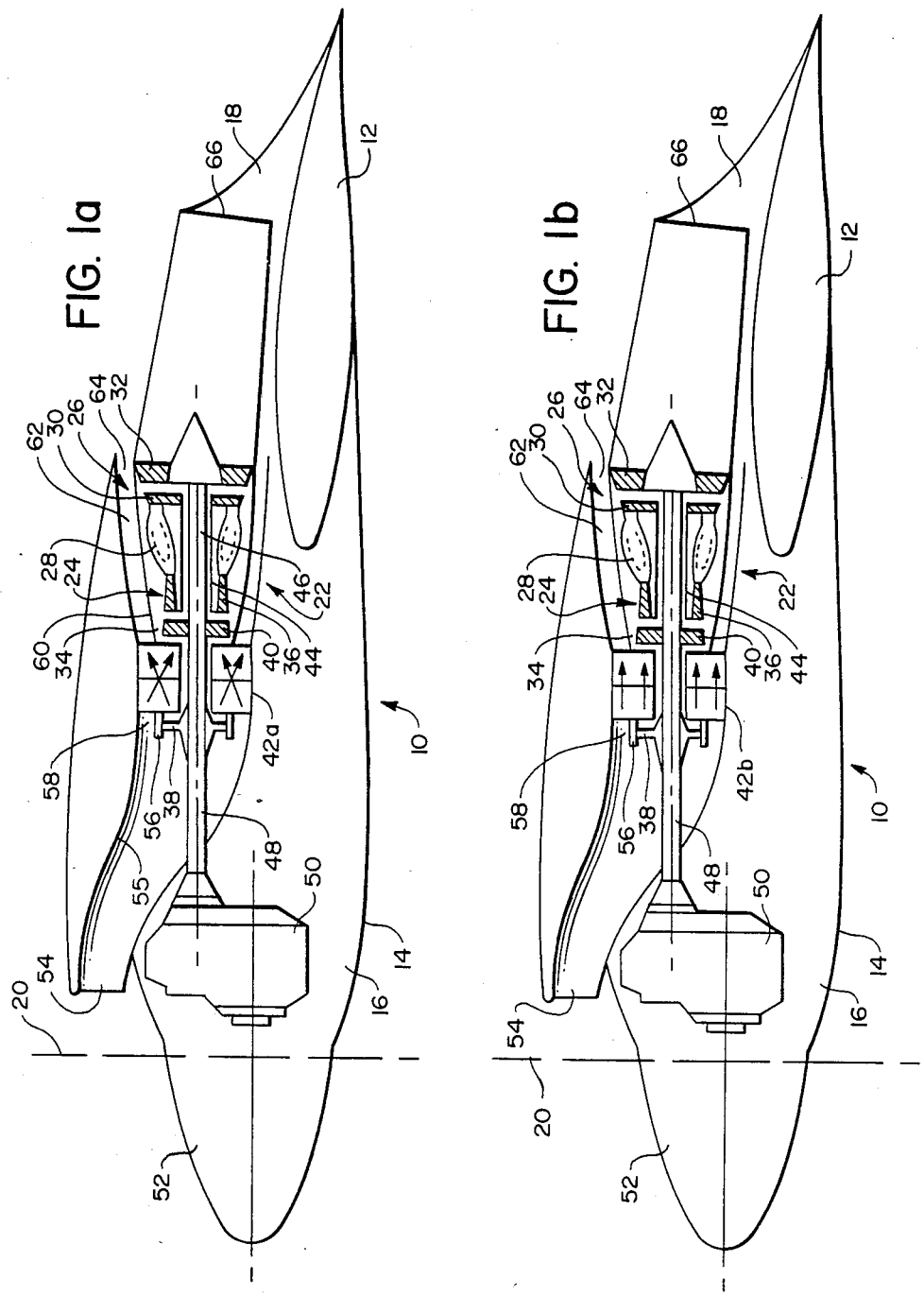
FIG. 1A is a semi-schematic side elevational view of a first embodiment of the present invention, showing certain of the engine components in section, and with the flow control system being shown in its flow inverting position.
FIG. 1B is essentially the same view as in FIG. 1A, but with the flow control system being in its non-inverting position.

In FIG. 1 there is a schematic showing of a first embodiment of the present invention. The engine 10 of the present invention is mounted above and forwardly of a wing 12 and comprises a housing 14 having a forward end 16 and an exhaust end 18. Rotatably mounted to the forward end of the engine 10 is a variable pitch propeller 20.

Positioned rearwardly of the propeller 20 is a core engine 22 having a compressor 24, a turbine 26 and a combustion section 28 positioned between the compressor 24 and turbine 26. The turbine 26 has a first stage 30 and a second stage 32, and the compressor has a first forward low pressure section 34 and a second rear high pressure section 36. The forward compressor section 34 comprises forward and rear compressor portions 38 and 40, respectively, spaced axially from one another and having a flow control device 42 positioned therebetween. The operation of this flow control device 42 in conjunction with the other components is quite significant in the present invention and will be described in more detail later herein.

The turbine first stage 30 is connected through an outer shaft 44 to the high pressure compressor section 36, and the turbine second stage 32 is connected through an inner shaft 46 to the forward and rear portions 38 and 40 of the forward compressor section 34. Also, the inner shaft 46 extends forwardly at 48 to connect to a speed reducing transmission 50 which drives the propeller 20 at a rotational speed slower than that of the turbine second stage 32. In addition, the propeller 20 is provided with positioning means 52 which can be operated to change the pitch of the blades of the propeller 20. Since the transmission 50 and positioning means 52 are or may be of conventional design, they will not be described in detail herein.

Located immediately behind the propeller 20 just above the transmission 50 is a main air inlet 54 which leads to the forward intake end of the compressor 24. Extending rearwardly from the inlet 54 is an inwardly facing surface 55 which defines a main through passageway. There is an annular wall 56 which surrounds the forward portion 38 of the forward compressor section 34 and is spaced inwardly of the surface 55. This wall 56 forms with the surface 55 an outer annular air inlet duct 58 which surrounds the forward compressor portion and is immediately forward of the flow control device 42. Located immediately rearwardly of the flow control device 42 is a second annular wall 60 which extends around the second rear compressor portion 40, the rear high pressure compressor section 36, the combustion section 28 and the turbine 26. This annular wall 60 forms with the surface 55 an annular bypass duct 62 which terminates in a rear nozzle 64. The gaseous exhaust from the turbine 26 exhausts through a rear central nozzle 66.

With respect to the flow control device 42, it will first be described functionally with reference to FIGS. 1A and 1B, after which the specific configuration of the preferred embodiment of this device 42 will be described with respect to FIGS. 2 through 8.

The flow control device 42 has two operating positions, namely a first inverted position 42a illustrated in FIG. 1A and a second non-inverted position shown at 42b in FIG. 1B. The flow control device 42 is moved to the first flow inverting position 42a during the take-off and climb mode, and then moved to the non-inverted position 42b for the cruise mode. The manner in which this contributes to the improved performance of the engine will be discussed later herein.

Figure 2:
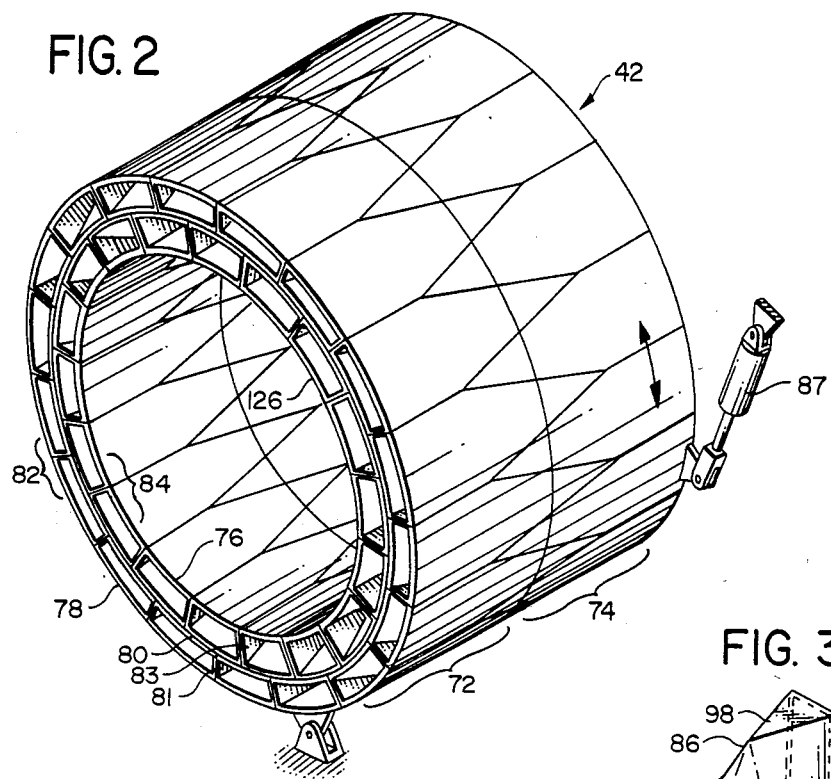
FIG. 2 is an isometric view of the flow control apparatus utilized in the present invention.

The preferred configuration of the flow control valve 42 is described in some detail in U.S. Pat. No. 3,792,584, so only the main features of this device 42 will be described herein. Reference is first made to FIG. 2, where it can be seen that the valve 42 is sectioned into relatively movable forward and aft portions 72 and 74, each bounded by an inner side 76 and an outer side 78 of an annular passageway. At the entrance of the device 42 (near side as shown), center wall structure 80 separates the passageway into a first duct means 82 having an annular entrance configuration and a second duct means 84 having an annular configuration concentric with, and inside of, the first duct means 82. Each of the first and second duct means 82 and 84 are divided into a plurality of individual basic duct elements 86. For purposes of illustration, circumferentially adjacent duct elements 86 are shown to be separated by radial walls 81 and 83 at the valve entrance plane. However, since the two basic separated flow patterns being controlled by the first and second duct means 82 and 84 are annular, the flow will naturally divide between circumferentially adjacent duct elements, and, therefore, in most practical embodiments, radial entrance (or exit) walls such as 81 and 83 will not be necessary or desirable. An actuator means 87 in combination with the fixed pin restraint shown provides a means for causing relative rotation of the aft portion 74 with respect to the forward portion 72.

Figure 3:
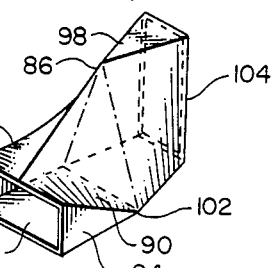
FIG. 3 is a detailed isometric view of one of the basic duct elements used in the flow control device of FIG. 2.

The basic duct element 86 is shown isolated in FIG. 3. For purposes of simplicity in describing the device 42, the duct elements 86 are shown to resemble individual building blocks, each having its own exterior wall structure. However, it will be readily understood that this is for purposes of illustration only, and in the present embodiment, adjacent duct elements will utilize single and common walls. Also, it will be noted that FIGS. 3 through 8 each show duct elements having straight line segments, or segments having an infinite annular radius, for ease of illustration. However, these contours could be varied to some degree. Further, for ease of illustration, in FIGS. 3 through 8, the elements 86 have not been shown with the overall curved configuration as shown in FIG. 2, where the elements 86 are shown as curved segments to fit collectively into an annular configuration.

As shown in FIG. 3, the basic duct element 86 can be seen to have a first wall surface 88; opposite facing symmetrically disposed second wall surfaces 90, 92 and third wall surfaces 94, 96; and an opposite wall surface 98. The duct element 86 defines at the entrance end (near side), a generally rectangular section 100 having one of its long sides formed by the first wall surface 88 and extending partially across the total passageway in a direction perpendicular to the first wall surface 88. The basic duct element 86 maintains a constant duct area along its length, and the wall surfaces 90, 92 provide a smooth gradual transition from the entrance rectangular section 100 to an intermediate triangular section 102, and then to a general rectangular section 104 which extends vertically across the passageway at the opposite end of the basic duct element 86. The first wall surface 88 is normally a wall segment of the total passageway and forms a long side of rectangular section 100, one side of triangular section 102, and a short side of rectangular section 104 at the opposite end of the duct element 86. The smooth gradual transition between each of the defined sections has been accomplished by shaping the second wall surface 90, 92 to create a uniformly varying curvature for the walls of the passageway.

Figure 4:
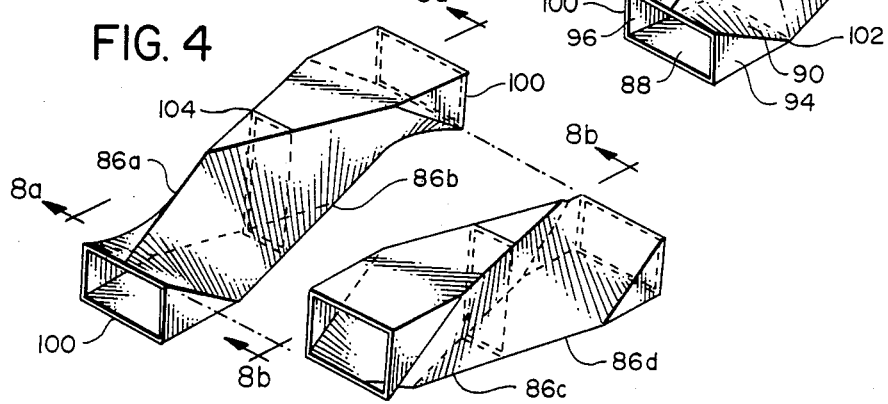
FIG. 4 is an exploded view of two individual adjacent duct means each comprising a pair of mated basic duct elements.

FIG. 4 is an exploded isometric view of two adjacent individual duct means each comprising a mated pair of basic duct elements 86 of the type shown in FIG. 3. Basic duct element 86a is identically disposed to the FIG. 3 element 86 and joined at its rectangular section 104 to a second element 86b which has been rotated and inverted from the FIG. 3 position. It will be readily apparent that flow entering rectangular section 100 of duct element 86a will be communicated through the mated rectangular sections 104 into duct element 86b and hence out of rectangular section 100 at the opposite end of the element 86b. Accordingly, when the duct system 86a, 86b is installed in a fluid passageway, the flow will be forced to enter a rectangular section extending partially across the passageway, passed through a rectangular section extending entirely across the passageway, and exit through a rectangular section which extends partially across the passageway from the opposite side of the passageway from that of the entrance end. In this manner, a first duct means is provided for inverting flow from the lower to the upper side of the passageway.

In a similar fashion in FIG. 4 adjacent elements 86c and 86d are mated together but rotated longitudinally so that they will conformably nest with elements 86a and 86b while providing a constant area second duct means for inverting flow from the upper to the lower side of the passageway.

Figure 5:
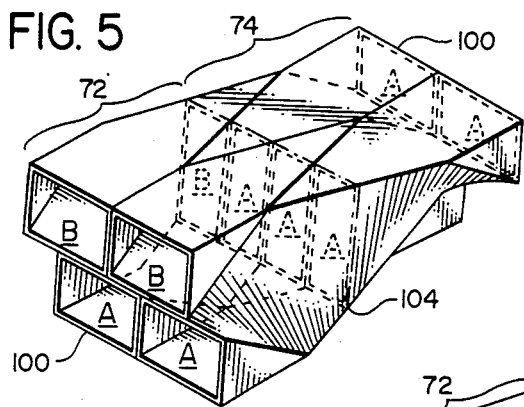
FIG. 5 is an isometric view of four adjacent duct means each comprising forward and aft basic duct elements aligned for flow inversion.

FIG. 5 shows a nested cluster of duct means of a type shown in individual detail in FIG. 4, conveniently sectioned into relatively movable forward and aft portions 72 and 74 which interface at the intermediate rectangular sections 104. With the forward and aft portions positioned as shown, flow inversion will take place. A first duct means A is located at the entrance end of the passageway adjacent to and below a second duct means B. As has been previously discussed, each of the duct means will receive flow at the entrance end from one side of the passageway and communicated to the opposite side at the exit end.

Figure 6:
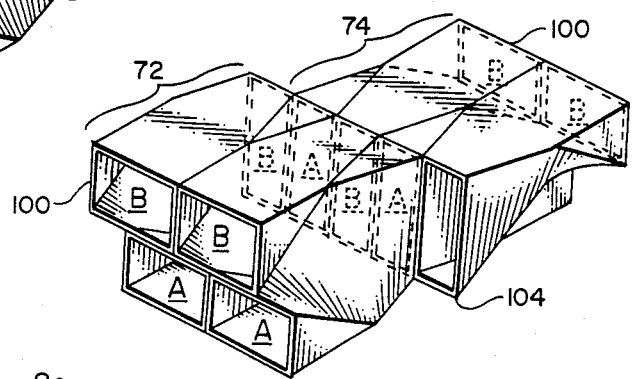
FIG. 6 corresponds to FIG. 5 with the forward and aft elements shifted and realigned for straight-through flow.

FIG. 6 shows the system of FIG. 5, wherein the relatively movable portions 72 and 74 have been displaced such that next adjacent sections 104 have been aligned to form new duct means which will pass the flow straight through the passageway between entrance cross sections and exit cross sections which are similarly disposed on the same side of the passageway. Accordingly, a simple mechanical device for circumferentially displacing either the forward or aft portion 72 or 74 will provide means for switching from inverted to straight-through flow. The relative positions of the basic duct elements 86 for the straight-through mode of operation are displayed more clearly in FIG. 7.

Figure 7:
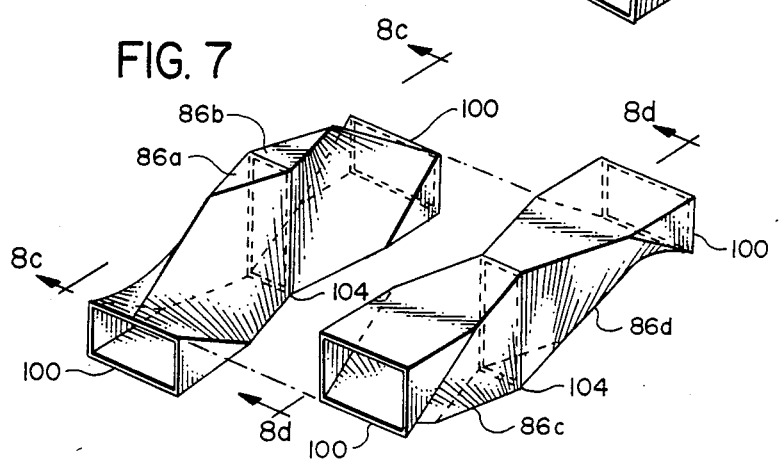
FIG. 7 is similar to FIG. 6 except that each pair of basic duct elements has been shifted and mated for straight-through flow.

FIG. 7 shows a pair of basic duct elements 86a and 86b mated at the rectangular sections 104 to form a duct means which receives flow from the lower entrance 100, communicates it through element 86b and out of the passageway through an exit section 100 located at the same side of the passageway. Similarly, the adjacent duct means formed by the mated elements 86c and 86d directs flow received from an upper entrance section 100 out of the passageway through an upper exit section 100 located on the same side of the passageway as that of the entrance section. FIGS. 8a, 8b, 8c and 8d are cross sectional views taken as designated in FIGS. 4 and 7. FIGS. 8a and 8b illustrate the flow paths for the individual next adjacent duct means of FIG. 4 when the system is used for flow inversion as in FIG. 1A. FIGS. 8c and 8d illustrate flow paths for straight-through flow when the device 42 is in its non-inverted position, such as is shown in FIG. 1B.

The flow control device 42 is so arranged relative to the annular walls 56 and 60 so that the rear edge of the annular wall 56 is closely adjacent the middle wall 80 of the device 42 and the forward edge of the rear annular wall 60 is closely adjacent to the rear edge of the middle annular wall 80 of the flow control device 42. Thus, the flow through the inlet duct 58 leads directly into the outer set of intake openings 100. The flow from the forward portion 38 of the forward compressor section 34 leads directly into the inner annular set of openings 100. The rear outer outlet openings 100 of the device 42 lead directly into the bypass duct 62, while the inner set of outlet openings 100 lead directly into the rear portion 40 of the forward compressor section 34. Thus, with the flow control device 42 in the inverting position 42a (as shown in FIGS. 4 and 5), the flow from the inlet duct 58 is inverted radially inwardly to pass through the rear portion 40 of the forward compressor section 34, and flow from the forward portion 38 of the forward compressor section 34 is diverted radially outwardly to pass into the bypass duct 62. With the flow control device 42 in the non-inverting position 42b, the flow into the inlet duct 58 passes directly through the flow control device 42 into the bypass duct 62, while the flow from the forward compressor portion 38 passes straight through to the rear compressor portion 40 of the forward compressor section 34.

It is to be understood that while the particular configuration of the flow control device 42 as shown above is the preferred configuration, it would be possible within the broader aspects of the present invention to utilize some other form of a flow inverting control device to accomplish the flow control functions of the engine of the present invention.

To describe the operation of the present invention, consideration is given first to the operation of the engine 10 during take-off and climb. In this operating mode, the propeller 20 is set at a relatively shallow pitch, and the flow control device 42 is moved to the inverting position 42a (as shown in FIGS. 4 and 5). Thus, the flow from the forward compressor portion 38 is directed through the bypass duct 62 and out the nozzle 64 to create a thrust. The flow through the inlet duct 58 is directed inwardly to pass through the rear portion 40 of the forward compressor section 34 and thence through the second high pressure compressor section 36, and thence to the combustion section 28. The gaseous flow from the combustion section 28 then passes through the two turbine stages 30 and 32 and thence out the central nozzle 66.

The power developed by the second turbine stage can be considered as being divided into three parts. There is a first part which delivers power to the rear portion 40 of the forward compression section 34 to compress the inlet air that is directed to the high pressure compressor section 36. There is a second part of the power from the second turbine stage 32 which drives the forward compressor portion 38 to provide the air flow that passes through the bypass duct 62, this air flow being translated directly into thrust. The third part of the power from the second turbine stage 32 is used to act through the speed reducing transmission 50 to drive the propeller 20.

It is apparent that in the position 42a for take-off and climb the rear portion 40 of the forward compressor section 34 and the second high power compressor section 36 collectively form the total compressor for the core engine 22 in the take-off and climb mode of operation. At the same time, the forward portion 38 of the forward compressor section 34 is in effect a fan which provides thrust by acting directly on the air stream. Since the thrust requirements for a typical airplane are greater during the take-off and climb, some of the burden that would otherwise be placed totally on the propeller 20 to provide this thrust is alleviated by the forward compressor portion 38 producing a portion of this thrust. This in turn reduces the maximum power requirements on the transmission 50. The rear compressor portion 40 and the second high pressure compressor section 36 are sized and arranged to match the power requirements of the two turbine stages 30 and 32 for conditions at take-off and climb (which would normally be higher ambient air pressure and temperature than would be encountered in comparison with the cruise mode which would take place at higher elevations). This differs from throttling-back the engine (by controlling or adjusting the fuel-air ratio as in a normal engine) because the gas generator (and power turbine section) are deprived of full mass flow and pressure by shunting off the front compressor 38. This effect is similar to "desupercharging" the engine. This technique allows the engine to operate at close to its design speed and efficiency, thus eliminating the losses that would normally occur when the engine speed reduces as it is throttled-back.

When the aircraft on which the engine 10 is mounted is in the cruise mode, the flow control device 42 is moved to its non-inverted position 42b, with the result that the flow from the forward portion 38 of the forward compressor section 34 passes directly through the rear compressor portion 40 and the second high pressure section 36, thus increasing the power available from the turbine stages 30 and 32 because of the increased mass flow and pressure that is made available from the supercharging effect of the front compressor 38. During this time, the propeller 20 is gradually shifted to a steeper pitch which would cause more efficient operation during the cruise mode. Thus, the flow into the inlet duct 58 simply passes through the bypass duct 62 and out the nozzle 64. The forward compressor portion 38 is so sized and arranged relative to the rear portion of the low pressure section 34 and the high pressure section 36 that in the non-inverted position the forward and rear portions 38 and 40 and the rear high pressure section 36 collectively match the power requirements of the two turbine stages 30 and 32 for conditions at cruise (which would normally be lower ambient pressure and temperature that would be encountered in comparison with the take-off and climb mode).

Therefore, in terms of function, it can be seen that the rear portion 40 of the low pressure compressor section 34 and the high pressure compressor section 36 collectively form a second compressor component which can be considered as a core engine compressor component which directs compressed air to the combustion section 26 both in the first take-off and climb mode and also in the second cruise mode. The forward compressor portion 38 of the low pressure compressor section 34 can, in terms of function, be considered as a first compressor component which functions in the take-off and climb mode as a fan member to act on the air stream to provide thrust in the form of air flow through the bypass duct 62. In the cruise mode, the first compressor component functions to compress air flow and feed it directly to the second compressor component (i.e. the combination of the second compressor portion 40 and the rear high pressure compressor section 36).

The inlet 58 can be considered as having an active and a passive mode. The active mode occurs during take-off and climb, where air flow from the inlet 58 is directed through the flow control device 42 to supply air to the second compressor component (i.e. the combination of the second compressor portion 40 and the rear high pressure section 36). The passive mode for the inlet 58 occurs during cruise, where the flow into the inlet 58 simply passes through the device 42 and the bypass duct 62 to pass out the rear duct nozzle 64.

Also, the bypass duct 64 can be considered to have an active and a passive mode. The active mode occurs during take-off and climb, when the duct 62 receives airflow from the first compressor component (i.e. the forward portion 38 of the low pressure section 34) and exhaust this flow through the duct nozzle 64 to provide a thrust. The passive mode occurs during cruise when the duct receives the flow from the inlet 58 and through the device 42 to pass out the outlet 64.

With regard to the matching of the various parts of the engine 10, the compression ratio of the second compressor component (i.e. the compressor component located downstream of the flow control device 42, which in the present embodiment is the rear portion 40 of the low pressure section 34 and the high pressure section 36) would be between about 20 to one and 30 to one during the take-off and climb mode. In this same take-off and climb mode, the compression ratio of the first compressor component (which in the present embodiment is the forward portion 38 of the low pressure compressor section 34) would be about 1.4 to one and 2.0 to one. In the cruise mode, where the flow from the forward compressor portion 38 flows through the flow control device 42 directly into the compressor portion 40, the total compression ratio of the entire compressor (i.e. made up of both low pressure compressor portions 38 and 40 and the high pressure section 36) would be between about 30 to one and 40 to one for the cruise mode of operation.

The bypass ratio of the propeller relative to the core engine 20, when operating in the cruise mode, would normally be about 80 to one. When the engine 10 is operating in the take-off and climb mode, the bypass ratio of the flow through the bypass duct 62 relative to the flow into the core engine 20 would be between about 0.5 to 1.0.

Further, the inner annular wall 56 would normally be arranged relative to the outer annular surface 55 so that the frontal area of the intake 58 would be about 60% of the frontal area of the forward portion 38 of the low pressure compressor section 34.

The relative values given in the three paragraphs immediately above would normally be applicable to a turboprop engine designed to cruise between Mach 0.7 and 0.8 at an elevation of between 30,000 to 40,000 feet. Such an engine would be expected to develop power between 8000 and 12,000 horsepower during take-off and climb, and 5000 to 7000 horsepower during the cruise mode. During take-off and climb, the horsepower absorbed by the forward compressor portion 38 (which is transmitted directly into thrust by developing air flow through the bypass passageway 62) would be expected to be about 60 and 100% of the horsepower absorbed by the propeller 20.

It is to be understood that the values given above are generally the preferred relationships of these components. However, within the broader aspects of the present invention, these ranges could be broadened.

FIG. 9 shows a second embodiment of the present invention. Components of this second embodiment which are similar to components of the first embodiment will be given like numerical designations, with an "e" suffix distinguishing those of the second embodiment. This second embodiment differs from the first embodiment of FIGS. 1A and 1B in that there is a third shaft 120 driven by a third turbine stage 122.

The shaft 120 is mounted within the shaft 46e and is connected to the speed reducing transmission 50e. The third turbine stage 122 is positioned directly behind the second turbine stage 32e, and it acts through the shaft 120 to supply power to the propeller 20e. Also, the compressor first section 34e is positioned entirely forwardly of its flow control device 42e.

The mode of operation of this second embodiment in FIG. 9 is substantially the same as that of the first embodiment shown in FIGS. 1a and 1b, so no detailed description of the operation of the second embodiment will be contained herein. Further, since most all of the components of the second embodiment in FIG. 9 are substantially the same as those of FIGS. 1A and 1B, except for those specifically identified above as being added to the second embodiment, no further description of those components will be contained herein.

A third embodiment of the present invention is shown in FIG. 10. Components of this third embodiment which are similar to components of the first embodiment of FIGS. 1A and 1B will be given like numerical designation, with an "f" suffixed distinguishing those in the third embodiment.

This third embodiment is quite similar to the first embodiment, except that the entire low pressure compressor section 34f is positioned forwardly of the flow control device 42f. Thus, the second compressor component (i.e. that portion of the compressor 24f which functions to provide bypass flow as thrust during the take-off and climb mode) and the high pressure compressor component 36f (i.e. that portion of the compressor 24f which during both operating modes compresses air which is fed directly to the combustion section 28f) are mounted to the same shaft 46f. In other respects, it is believed that an understanding of the various parts of the engine and their function are readily understandable from the above description of the embodiment, so no further description of this third embodiment will be contained herein.

A fourth embodiment of the present invention is shown in FIG. 11. Components of this fourth embodiment which are substantially similar to those in the other embodiments will be given like numerical designations, with a "g" suffixed distinguishing those of this fourth embodiment.

The engine 10g of this fourth embodiment comprises a housing 14g having a forward end 16g and an exhaust end 18g. A variable pitch dual propeller 20g having counter rotating blades is mounted at the aft end of the engine 10g.

The core engine is indicated schematically at 22g, and it is to be understood that this core engine 22g comprises a compressor, turbine, and combustion section as in the previous embodiments. The flow control device 42g is positioned at a location forwardly of the core engine 22g, and the low pressure compressor component 38g is located forwardly of the flow control device 42g.

The bypass duct 62g terminates at an outlet section 150. The gaseous exhaust from the core engine passes through rearwardly and radially outwardly extending duct means 152 toward the outlet 150. In one configuration, the flow through the bypass duct 62g can pass through an outer annular duct portion 154, and the flow from the gaseous exhaust duct means 152 can exit through an inner annular outlet portion 156. Alternatively, the flow from the bypass duct 62g and from the duct means 152 can be mixed at the outlet 150, this function being indicated schematically by the broken line at 158.

The flow from the outlet at 150 passes through the inner portion of the path of the propeller 20g. If the flow through the duct 62g and the duct means 152 is mixed at the outlet 150, this would produce a combined flow of an intermediate temperature, and this may be advantageous if it is desired to keep the temperature of the gaseous flow through the propeller area below a certain level.

It is to be understood that various modifications could be made to the embodiments described herein without departing from the broader concepts of the present invention.

What is claimed is:

1. A turboprop engine comprising:
   (a) a compressor having a low pressure compressor component and a high pressure compressor component;
   (b) a turbine operatively connected through drive means to said compressor;
   (c) a combustion section arranged to receive air flow from the compressor and burn fuel therein to provide a gaseous flow to drive the turbine;
   (d) a variable pitch propeller rotatably mounted and positioned to react against ambient air to produce a thrust;
   (e) a speed reducing transmission operatively connected between said turbine and said propeller to drive said propeller at a reduced rotational speed relative to the turbine;
   (f) air inlet means to direct air flow into said engine;
   (g) air inlet bypass means arranged to provide a bypass inlet air flow that bypasses said low pressure compressor component;
   (h) air outlet bypass duct means arranged to provide air flow that bypasses the high pressure compressor component, combustion section, and the turbine;
   (i) flow control means operatively positioned to receive air flow from said air inlet bypass means and air flow from said low pressure compressor component, and to direct air flow to said air outlet bypass duct means and air flow to said high pressure compressor component, said flow control means having a first position where air flow from said air inlet bypass means is directed to said high pressure compressor component and air flow from said low pressure compressor component is directed to said air outlet bypass duct means, and a second position where air flow from the air inlet bypass duct means is directed to the air outlet bypass duct means and air from the low pressure compressor component is directed to the high pressure compressor component.

2. The engine as recited in claim 1, wherein there are first and second turbine stages and first and second compressor sections operatively connected to said second and first turbine stages, respectively, said first compressor section having forward and rear portions, said flow control means being operatively positioned between the first and second portions of the first compressor section, whereby said forward compressor portion comprises said low pressure compressor component and said second compressor portion and said second compressor section comprises said high pressure compressor component.

3. The engine as recited in claim 1, wherein there are first and second turbine stages and first and second compressor sections operatively connected to, respectively, said second and first turbine stages, said flow control means being operatively positioned between said first and second compressor sections.

4. The engine as recited in claim 3, wherein there is a third turbine stage operatively connected to said speed reducing transmission.

5. The engine as recited in claim 1, wherein there are first, second and third turbine stages, and there are first and second compressor sections, operatively connected to said second and first turbine stages, respectively, said turbine third stage being operatively connected to said speed reducing transmission.

6. The engine as recited in claim 1, wherein said turbine is operatively connected to said compressor through a single drive connection, and said low pressure and high pressure compressor components are both driven directly from said drive connection.

7. The engine as recited in claim 1, wherein said propeller is mounted forwardly of said air inlet means, and a portion of air flow from said propeller passes into said air inlet means.

8. The engine as recited in claim 1, wherein said propeller is mounted rearwardly of said turbine, and said speed reducing transmission is positioned rearwardly of said turbine.

9. The engine as recited in claim 8, wherein flow from said air outlet bypass duct means and gaseous flow from said turbine pass through an area in which said propeller operates, air outlet means arranged to mix flow from said bypass duct means and gaseous flow from said turbine.

10. The engine as recited in claim 1, wherein said flow control means comprises a forward flow control section having a forward inlet and a rear outlet, said second flow control section having a forward inlet and a rear outlet, the inlet of the first flow control section having inner and outer annular ducts, with said inner and outer annular ducts expanding radially toward said outlet so as to be arranged circumferentially adjacent each other and form duct outlets of the first flow control section, said second flow control section having duct inlets matching in configuration the duct outlets of the first flow control section, the duct inlets of the second flow control section diminishing in width radially in a rearward direction and terminating in duct outlets of the second flow control section, with the duct outlets of the second flow control section being arranged in inner and outer sets of duct outlets, means to rotate said first and second flow control sections relative to one another.

11. The engine as recited in claim 1, wherein with the flow control means in the first position, flow through the bypass duct relative to flow through the high pressure compressor component has a bypass ratio of about 0.5 to 1.0.

12. The engine as recited in claim 1, wherein the low pressure compressor component has a compression ratio of about 1.4 to 2.0.

13. The engine as recited in claim 1, wherein the high pressure compressor component has a compression ratio between about 20 to 30.

14. The engine as recited in claim 1, wherein the low pressure compressor component has a compression ratio of about 1.4 to 2.0, and the low pressure compressor component has a compression ratio between about 20 to 30.

15. The engine as recited in claim 1, wherein with the flow control means in the first position, flow through the bypass duct relative to flow through the high pressure compressor component has a bypass ratio of about 0.5 to 1.0, the low pressure compressor component has a compression ratio of about 1.4 to 2.0, and the low pressure compressor component has a compression ratio between about 20 to 30.

16. A method of operating a turboprop engine, wherein said engine comprises:
 (a) a compressor having a low pressure compressor component and a high pressure compressor component;
 (b) a turbine operatively connected through drive means to said compressor;
 (c) a combustion section arranged to receive airflow from the compressor and burn fuel therein to provide a gaseous flow to drive the turbine;
 (d) a variable pitch propeller rotatably mounted and positioned to react against ambient air to produce a thrust;
 (e) a speed reducing transmission operatively connected between said turbine and said propeller to drive said propeller at a reduced rotational speed relative to the turbine;
 (f) air inlet means to direct airflow into said engine;
 (g) air inlet bypass means arranged to provide a bypass inlet airflow that bypasses said low pressure compressor component;
 (h) air outlet bypass duct means arranged to provide airflow that bypasses the high pressure compressor component, combustion section, and the turbine; said method comprising:
 (a) receiving airflow from said air inlet bypass means and airflow from said low pressure compressor component, and directing airflow through flow control means to said air outlet bypass duct means and airflow to said high pressure compressor component;
 (b) during take-off mode directing airflow from said air inlet bypass means to said high pressure compressor component and airflow from said low pressure compressor component to said air outlet bypass duct means;
 (c) during cruise mode directing airflow from the air inlet bypass duct means to the air outlet bypass duct means and air from the low pressure compressor component to the high pressure compressor component.

17. The method as recited in claim 16, wherein in the engine there are first and second turbine stages and first and second compressor sections operatively connected to said second and first turbine stages, respectively, said first compressor section having forward and rear portions, said flow control means being operatively positioned between the first and second portions of the first compressor section, said method further comprising directing air from said flow control means to said second compressor portion as the second compressor component.

18. The method as recited in claim 16, wherein in the engine there are first and second turbine stages and first and second compressor sections operatively connected to, respectively, and said second and first turbine stages, said flow control means being operatively positioned between said first and second compressor sections, said method further comprising directing air from the flow control means to the second compressor section.

19. The method as recited in claim 18, comprising driving said speed reducing transmission from a third turbine stage.

20. The method as recited in claim 16, wherein there are first, second and third turbine stages, driving said first and second compressor sections from said second and first turbine stages, respectively, and driving said speed reducing transmission from said third turbine stage.

21. The method as recited in claim 16, wherein said turbine is operatively connected to said compressor through a single drive connection, said method comprising driving said low pressure and high pressure compressor components directly from said drive connection.

22. The method as recited in claim 16, wherein said propeller is mounted rearwardly of said turbine, and said speed reducing transmission is positioned rearwardly of said turbine, said method comprising directing flow from said air outlet bypass duct means and gaseous flow from said turbine pass through an area in which said propeller operates, and mixing flow from said bypass duct means and gaseous flow from said turbine.

23. The method as recited in claim 16, wherein during take-off mode, flow through the bypass duct relative to flow through the high pressure compressor component has a bypass ratio of about 0.5 to 1.0.

24. The method as recited in claim 16, wherein the low pressure compressor component operates at a compression ratio of about 1.4 to 2.0.

25. The method as recited in claim 16, wherein the high pressure compressor component operates at a compression ratio between about 20 to 30.

26. The method as recited in claim 16, wherein the low pressure compressor component operates at a compression ratio of about 1.4 to 2.0, and the low pressure compressor component operates at a compression ratio between about 20 to 30.

27. The method as recited in claim 16, wherein during take-off mode, flow through the bypass duct relative to flow through the high pressure compressor component operates at a bypass ratio of about 0.5 to 1.0, the low pressure compressor component operates at a compression ratio of about 1.4 to 2.0, and the low pressure compressor component operates at a compression ratio between about 20 to 30.

* * * * *